United States Patent [19]

Gartland et al.

[11] Patent Number: 5,058,647

[45] Date of Patent: * Oct. 22, 1991

[54] TIRE HAVING DECORATIVE APPLIQUE ON SIDEWALL AND METHOD FOR PREPARING SAME

[75] Inventors: Robert J. Gartland, Youngstown; Anthony F. Finelli, Akron; Anthony J. Bell, Stow, all of Ohio

[73] Assignee: The Goodyear Tire & Rubber Company, Akron, Ohio

[ * ] Notice: The portion of the term of this patent subsequent to Nov. 6, 2007 has been disclaimed.

[21] Appl. No.: 568,119

[22] Filed: Aug. 16, 1990

Related U.S. Application Data

[63] Continuation-in-part of Ser. No. 255,699, Oct. 11, 1988, Pat. No. 4,967,818.

[51] Int. Cl.$^5$ .................. B60C 13/04; B29B 17/00; C08L 47/00

[52] U.S. Cl. ..................... 152/524; 152/525; 152/DIG. 12; 156/116; 525/237

[58] Field of Search ....... 152/523, 524, 525, DIG. 12; 156/116; 40/587, 616; 525/237

[56] References Cited

U.S. PATENT DOCUMENTS

| | | | |
|---|---|---|---|
| 2,979,099 | 4/1961 | Rowe | 152/525 X |
| 3,073,371 | 1/1963 | Leeper . | |
| 3,830,274 | 8/1974 | Waser, Jr. . | |
| 4,220,564 | 9/1980 | Tanimoto et al. | 525/237 X |
| 4,684,431 | 8/1987 | Shurman et al. | 156/116 |
| 4,790,365 | 12/1988 | Sandstrom et al. | 152/510 |
| 4,967,818 | 11/1990 | Gartland et al. | 152/524 |

FOREIGN PATENT DOCUMENTS

| | | | |
|---|---|---|---|
| 249918 | 12/1987 | European Pat. Off. . | |
| 3046572 | 7/1982 | Fed. Rep. of Germany . | |
| 54-132907 | 10/1979 | Japan | 152/525 |
| 55-152605 | 11/1980 | Japan | 152/525 |
| 58-34834 | 3/1983 | Japan | 152/525 |

*Primary Examiner*—Michael W. Ball
*Assistant Examiner*—Gregory J. Wilber
*Attorney, Agent, or Firm*—Alvin T. Rockhill

[57] ABSTRACT

Tires having white sidewalls are very popular in the United States and Canada. Tires having white lettering thereon are also very popular. This invention discloses a process for preparing such tires having decorative appliques thereon. By practicing the process of this invention, tires having better uniformity can be built at lower costs than when standard tire building techniques are utilized. This invention specifically relates to a method of preparing a pneumatic rubber tire having a decorative design on the sidewall thereof which comprises (a) applying the decorative applique to the sidewall of an uncured tire and (b) curing the tire; wherein the decorative applique is comprised of from about 25 weight percent to about 75 weight percent syndiotactic 1,2-polybutadiene having a melting point which is within the range of about 70° C. to about 160° C. and from about 25 weight percent to about 75 weight percent of at least one polydiene rubber which is cocurable with said syndiotactic 1,2-polybutadiene, sulfur, zinc oxide and at least one pigment or colorant.

20 Claims, No Drawings

TIRE HAVING DECORATIVE APPLIQUE ON SIDEWALL AND METHOD FOR PREPARING SAME

This is a Continuation-in-Part of Application Ser. No. 07/255,699, filed on Oct. 11, 1988 now issued as U.S. Pat. No. 4,967,818.

BACKGROUND OF THE INVENTION

White sidewall tires are very popular in the United States and Canada. Tires having other types of appliques on the sidewalls thereof, such as lettering, logos, and the like, are also very popular. However, the construction of tires having white sidewalls or decorative appliques on the sidewall thereof is a complicated procedure. It involves the coextrusion of a black sidewall rubber with a white sidewall rubber and laminating a protective cover strip over the white rubber to form a sidewall preassembly. This tire sidewall preassembly is then applied in sequence with the other required tire components to the tire building drum to form a green or uncured tire. The green tire is then typically cured in a tire press, with the desired applique being formed by the grooves in the tire mold. After the tire has been cured, it is carefully ground and buffed to expose the decorative applique which was previously covered and protected by the cover strip.

Coextrusion is a complicated process which involves the utilization of sophisticated equipment and a large number of profile dies. The grinding and buffing step which is required to remove the cover strip is also complicated and labor intensive. These additional steps which are required in building tires having decorative appliques on a sidewall thereof add significantly to the cost of building the tire.

In conventional white sidewall tires, the white rubber component represents a very substantial portion of the sidewall. However, it is desirable for tires to have thin sidewalls in order to attain desired performance characteristics. Accordingly, the decorative applique on the sidewall of a tire should be as thin as possible. Nevertheless, certain production and performance criteria has limited the degree to which the thickness of sidewall applique can be reduced.

There are additional problems associated with tires having decorative applique on a sidewall thereof which are built using standard techniques. For instance, such tires have more blemishes, imperfections, and voids in the sidewall area as compared to black sidewall tires. Additionally, problems associated with the white sidewall splice opening sometimes also occur. Misalignment of the white sidewall preassembly relative to mold grooves is a frequently encountered problem which leads to blemished tires. The grinding procedure used in building standard tires having decorative appliques on a sidewall thereof some times leads to the formation of surface crack sites.

For the aforementioned reasons, tires having decorative appliques on a sidewall thereof and the conventional procedures used in building such tires leave much to be desired. To obviate these shortcomings associated with standard techniques for building tires having decorative appliques on a sidewall thereof, it has been proposed to replace the previously known sidewall decorative features with appliques which are painted on to conventional black wall tires. However, painting designs on to the sidewall of tires has not proven to be a satisfactory answer to the problem. This is largely due to the fact that designs which are painted on are quite thin and can be easily damaged by scraping, scuffing and the like.

The concept of applying premolded tire sidewall appliques to standard black wall tires has also been proposed. For example, such a procedure is described in European Patent Application Publication No. 249,918. However, such procedures have not proven to be entirely satisfactory. For instance, difficulties have been encountered with maintaining adequate adhesion between the sidewall applique and the tire. More specifically, tires made utilizing such techniques typically have inferior scuff resistance such that the applique fails at the interface.

SUMMARY OF THE INVENTION

By practicing the technique of this invention, uncured tire sidewall appliques can be successfully applied to standard uncured black wall tires. These appliques can be affixed to uncured tires prior to putting them in the curing mold or the appliques can be placed in a specific location in the curing mold, such as a white sidewall groove, prior to putting the uncured tire in the curing mold. This technique involves utilizing decorative appliques which are comprised of from about 25 weight percent to about 75 weight percent syndiotactic 1,2-polybutadiene and from about 25 weight percent to about 75 weight percent of at least one polydiene rubber. In the method of this invention, the decorative design is simply applied to the sidewall of a standard uncured black wall tire with the tire being subsequently cured so as to permanently affix the decorative design or applique to the sidewall thereof.

This invention specifically discloses a method of preparing a pneumatic rubber tire having a decorative applique on the sidewall thereof which comprises (a) applying the decorative applique to the sidewall of an uncured tire; wherein the decorative applique has a thickness which is within the range of about 10 mils to about 125 mils; and (b) curing the tire; wherein the decorative design is comprised of from about 25 weight percent to about 75 weight percent syndiotactic 1,2-polybutadiene having a melting point which is within the range of about 70° C. to about 160° C. and from about 25 weight percent to about 75 weight percent of at least one polydiene rubber which is cocurable with said syndiotactic 1,2-polybutadiene, sulfur, zinc oxide, and at least one pigment or colorant.

The subject invention also reveals a pneumatic tire having a decorative applique on the sidewall thereof, comprising an outer circumferential tread, a supporting carcass therefor, two-spaced beads and two rubber sidewalls connecting said beads; wherein at least one of said sidewalls has a decorative applique thereon; wherein the decorative applique has a thickness which is within the range of about 10 mils to about 125 mils; and wherein said decorative applique is comprised of from about 25 weight percent to about 75 weight percent syndiotactic 1,2-polybutadiene having a melting point which is within the range of about 70° C. to about 160° C. and from about 25 weight percent to about 75 weight percent of at least one polydiene rubber which is cocured with said syndiotactic 1,2-polybutadiene, and at least one pigment or colorant.

DETAILED DESCRIPTION OF THE INVENTION

Standard uncured black wall tires are utilized in manufacturing the tires of this invention which have a decorative applique on a sidewall thereof. The uncured black wall tire which is utilized is built utilizing conventional procedures which are well known to persons skilled in the art of building black wall tires. In accordance with this invention, the decorative applique is affixed as desired to the sidewall of the green black wall tire. The tire is then cured in a mold utilizing standard curing procedures. The decorative applique can be applied to the sidewall of the uncured tire before it is put in the curing mold. However, it is normally advantageous to position the decorative applique in the tire mold prior to putting the uncured tire therein. In either case, during the curing process the decorative applique becomes securely bound to the tire sidewall. It is believed that the syndiotactic 1,2-polybutadiene (SPBD) and the diene rubbers in the decorative applique cocured with the rubbers in the sidewall of the uncured tire. It is, accordingly, believed that the decorative applique becomes cocured to the standard tire sidewall.

The syndiotactic 1,2-polybutadiene used in the practice of the subject invention normally has more than 65% of its monomeric units in a syndiotactic 1,2-configuration. SPBD can be prepared in an inert organic solvent utilizing the technique described in U.S. Pat. No. 3,901,868 or in an aqueous medium utilizing the process described in U.S. Pat. No. 4,506,031. U.S. Pat. No. 4,506,031 more specifically reveals a process for producing polybutadiene composed essentially of SPBD comprising the steps of:

(A) preparing a catalyst component solution by dissolving, in an inert organic solvent containing 1,3-butadiene (a) at least one cobalt compound selected from the group consisting of (i) $\beta$-diketone complexes of cobalt, (ii) $\beta$-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones, and N,N-dialkylamides, and (b) at least one organoaluminum compound of the formula $AlR_3$, wherein R represents a hydrocarbon radical of 1 to 6 carbon atoms;

(B) preparing a reaction mixture by mixing said catalyst component solution with a 1,3-butadiene/water mixture containing desired amounts of said 1,3-butadiene;

(C) preparing a polymerization mixture by mixing carbon disulfide throughout said reaction mixture, and (D) polymerizing said 1,3-butadiene in said polymerization mixture into polybutadiene while agitating said polymerization mixture. In the process described therein the crystallinity and melting point of the SPBD can be controlled by adding alcohols, ketones, nitriles, aldehydes or amides to the polymerization mixture.

The SPBD utilized in making the decorative appliques for tires has a melting point of about 160° C. or less. The SPBD will normally have a melting point within the range of about 70° C. to about 160° C. It is generally preferred for the SPBD utilized in making decorative white sidewalls for passenger car or truck tires to have a melting point which is within the range of about 80° C. to about 150° C. with a melting point which is within the range of 90° C. to 125° C. being most preferred. The melting points referred to herein are the minimum endotherm values determined from DSC (differential scanning calorimetry) curves.

The compositions utilized in making the decorative appliques of this invention is a blend which is comprised of SPBD and at least one rubber which is cocurable with the SPBD. The rubber used in such blends can be virtually any type of elastomer which contains unsaturation that allows for sulfur curing. Typically, the elastomer will be one or more polydiene rubbers. Some representative examples of suitable polydiene rubbers include cis-1,4-polybutadiene, natural rubber, synthetic polyisoprene, styrene butadiene rubber, EPDM (ethylene-propylene-diene monomer) rubbers, isoprene-butadiene rubbers, and styrene-isoprene-butadiene rubbers. In many cases it will be desirable to utilize a combination of diene rubbers in the blend. For instance, the rubber portion of the blend can be a combination of chlorobutyl rubber, natural rubber, and EPDM rubber. It is particularly preferred to utilize a combination which contains from about 30 weight percent to about 80 weight percent chlorobutyl rubber, from about 15 weight percent to about 55 weight percent natural rubber, and from about 2 weight percent to about 10 weight percent EPDM rubber as the rubber component in such blends. A rubber composition which contains from about 55 weight percent to about 65 weight percent chlorobutyl rubber, from about 25 weight percent to about 45 weight percent natural rubber, and from about 3 weight percent to about 7 weight percent EPDM rubber is more highly preferred.

The blend utilized in preparing the decorative applique will normally contain from about 25 weight percent to about 75 weight percent SPBD and from about 75 weight percent to about 25 weight percent elastomers which are cocurable with the SPBD. The inclusion of high levels of SPBD results in better adhesion, abrasion, and tear resistance for the cured material. High levels of SPBD also result in increased green strength and stiffness. Additionally, the use of high levels of SPBD reduces green tack which makes handling easier and allows for stacking without the use of a substrate. However, the incorporation of large amounts of SPBD into the blend also results in reduced flexibility and modulus. Accordingly, for the best balance of overall properties, the blend utilized will contain from about 33 weight percent to about 67 weight percent SPBD and from about 67 weight percent to about 33 weight percent cocurable rubbers. The blends which are most highly preferred will contain from about 45 weight percent to about 55 weight percent SPBD and from about 55 weight percent to about 45 weight percent of the elastomeric component.

The SPBD used in making the blends from which the appliques are formed is generally incorporated into the blend in powder or pellet form. In other words, the SPBD is in the form of a powder or pellet at the time it is compounded with the rubber component utilized in making the blend of which the decorative applique is comprised. The SPBD utilized in accordance with this invention can be reduced to powder form by grinding or another appropriate technique.

The SPBD powder or pellets can be mixed into the rubber component utilizing standard mixing techniques. However, the mixing is normally carried out at a temperature which is at least as high as the melting point of the SPBD being utilized. During the mixing procedure, the SPBD powder pellets are fluxed into the rubber with additional desired compounding ingredients. Such mixing is typically carried out in a Banbury mixer, a mill mixer or in some other suitable type of mixing device.

In an alternative embodiment of this invention, the blend utilized in preparing the decorative applique is prepared by inverse phase polymerization. For example, a blend of SPBD with cis-1,4-polybutadiene can be prepared in an organic solvent by inverse phase polymerization. In such a procedure, the cis-1,4-polybutadiene is first synthesized in an organic solvent under solution polymerization conditions. This polymerization can be catalyzed by using a variety of catalyst systems. For instance, a three component nickel catalyst system which is comprised of an organoaluminum compound, a soluble nickel containing compound and a fluorine containing compound can be utilized to catalyze the polymerization. Such a polymerization can also be catalyzed by utilizing rare earth catalyst systems, such as lanthanide systems, which are normally considered to be "pseudo-living". Such rare earth catalyst systems are normally comprised of three components which include (1) an organoaluminum compound, (2) an organometallic compound which contains a metal from Group III-B of the Periodic System, and (3) at least one compound which contains at least one labile halide ion. Metals from Group I and II of the Periodic System can also be utilized as catalysts for polymerizing 1,3-butadiene monomer into cis-1,4-polybutadiene. The metals which are most commonly utilized in such initiator systems include barium, lithium, magnesium, sodium and potassium with lithium and magnesium being the most commonly utilized. The cis-1,4-polybutadiene cement which is synthesized is then subsequently utilized as the polymerization medium for the synthesis of the SPBD. It will generally be desirable to add additional 1,3-butadiene monomer to the cis-1,4-polybutadiene cement for the synthesis of the SPBD. In some cases, it will also be desirable to add additional solvent. The amount of monomer added will be contingent upon the proportion of SPBD desired in the blend being prepared. It will, of course, also be necessary to add a catalyst system to the rubber cement which is capable of promoting a polymerization which results in the formation of SPBD. A detailed description of such catalyst systems is given in U.S. Pat. No. 3,778,424 which is herein incorporated by reference in its entirety.

The blend of SPBD and rubber will also contain other standard rubber chemicals. For instance, such blends will additionally contain sulfur and at least one desired colorant or pigment. They will also typically contain other rubber chemicals, such as antioxidants, accelerators, oils, and waxes in conventional amounts. For instance, the SPBD/rubber blend will normally contain from about 0.2 to about 8 phr of sulfur. It is generally preferred for the blend to contain from about 0.5 to 4 phr of sulfur with it being most preferred for such blends to contain from 1 to 2.5 phr of sulfur. A primary accelerator is generally also present at a concentration which is within the range of about 0.1 to about 2.5 phr. It is normally preferred for the primary accelerator to be present at a concentration which is within the range of about 0.2 to about 1.5 phr with it being most preferred for the primary accelerator to be at a concentration of 0.3 to 1 phr. Secondary accelerators will also commonly be utilized at a concentration which is within the range of about 0.02 to about 0.8 phr. Secondary accelerators are preferably utilized at a concentration of 0.05 to 0.5 phr with the utilization of 0.1 to 0.3 phr of a secondary accelerator being most preferred. Such SPBD/rubber blends will typically contain from about 1 to about 10 phr of various processing oils and it is generally preferred for such blends to contain from about 2.5 to about 7.5 phr of processing oils. The SPBD/rubber blend will generally contain from about 25 phr to about 100 phr of various fillers such as clay and/or titanium dioxide. It is normally preferred for such blends to contain from about 40 phr to about 80 phr fillers. It should be noted that titanium dioxide acts as both a filler and a white pigment. Some representative examples of colorants that can be utilized in the SPBD/rubber blend to impart desired colors to the decorative appliques include diarylid yellow 17, pththalocy blue 15, diarylid orange 13, and perm red 2B (red 48:1).

After the SPBD/rubber blend has been compounded as desired, it is processed into the desired decorative applique. This can be accomplished by milling and calendering the compounded blend into a continuous sheet and subsequently cutting an applique having the desired shape out of the sheet. Sheets of the compounded SPBD/rubber blend can also be made by continuous cold feed extrusion, such as with twin screw equipment or single screw extruders with mixing sections. Decorative appliques in the form of strips, rings, logos, letters, or numbers can also be prepared by injection molding or transfer molding.

The decorative appliques utilized in the process of this invention that are obtained from calendered film will normally have a thickness which ranges from about 10 mils to about 80 mils (0.010 to 0.080 inch). However, appliques having a thickness within the range of about 15 mils to about 50 mils will normally be utilized to save material. This is because satisfactory performance can normally be obtained without the need for utilizing thicker decorative appliques. Letters, numbers, and logos which are made by calendering will normally have a thickness of about 30 mils to about 50 mils. On the other hand, decorative appliques having a thickness of less than about 40 mils are generally difficult to injection mold. For this reason, appliques which are injection molded will normally have a thickness of at least about 60 mils. There are generally no problems in calendering sheets of the SPBD/rubber component blends which have thicknesses of less than 30 mils. For this reason, thin appliques will normally be calendered into sheets with the desired design being cut therefrom. White sidewall rings which are made by injection molding will generally be from about 60 mils to about 125 mils thick and will preferably be from about 70 mils to about 90 mils thick.

The present invention will be described in more detail in the following examples. The subject invention will also be contrasted to other possible techniques for affixing decorative appliques to the sidewalls of tires in certain comparative examples which are included. These examples are merely for the purpose of illustrating the subject invention and are not to be regarded as limiting the scope of the subject invention or the manner in which it can be practiced. Unless specifically indicated otherwise, all parts and percentages are given by weight.

EXAMPLE 1

A SPBD/rubber blend containing 50 weight percent SPBD, 30 weight percent chlorobutyl rubber, 17.5 weight percent natural rubber and 2.5 weight percent EPDM rubber, based upon total polymers, was prepared using conventional Banbury mixing procedures for non-productive and productive batches. The SPBD/rubber blend also contained 4.75 phr of processing oils, 1.0 phr of antioxidants, 1.0 phr of stearic acid, 27.5 phr of clay, 37.5 phr of titanium dioxide, 0.175 phr of a blue pigment, 5.0 phr of zinc oxide, 1.2 phr of sulfur, and 1.54 phr of an accelerator. The SPBD utilized in this example had a melting point of 123° C. It should be noted that the SPBD utilized in accordance with this invention is a crosslinking thermoplastic resin. However, SPBD is considered to be a rubber in calculating phr (parts per hundred parts of rubber).

The SPBD/rubber blend was Banbury mixed and milled into continuous strips. The strips were then used in injection molding equipment to obtain white sidewall quarter segments which were 65 mils thick. This injection molding process involves heating the SPBD/rubber blend in a temperature controlled barrel and injection of the hot SPBD/rubber blend into a cooler mold to permit the recrystallization of the SPBD. After molding, the white sidewall quarter segment was considered to be dimensionally stable and was stiff in the uncured state. The white sidewall quarter segments made had minimal green tack adhesion to themselves and did not stick together.

A 75 ton Van Dorn injection molding machine was used in making the white sidewall segments. In a typical molding cycle, the operator closes the safety gate located at the clamp/mold area which activates the molding cycle start. The clamp moves forward closing the mold halves and builds sufficient force (clamp tonnage) to hold the mold halves closed against the high injection pressure of the polymer blend into the mold cavity. The SPBD/rubber blend is forced into the mold cavity by the forward motion of the reciprocating screw. Pressure and injection rates are very high initially in order to completely fill the mold cavity before the melt begins to cool and set-up. In fact, pressure can reach as high as 20,000 psi ($1.379 \times 10^8$ Pascals). After the mold cavity is almost filled, the pressure and fill rate are reduced to accomplish final filling (hold pressure) and packing the mold cavity. When the cavity sprue gates have solidified, the injection pressure is relieved.

The screw within the injection unit simultaneously rotates to build a shot for injection in the next cycle. While this is occurring, SPBD/rubber blend that has been injected into the mold cavity is cooling and solidifying. After sufficient cooling time, the clamping mechanism is released, the mold is opened and the white sidewall ring segment is removed. The gate is then closed to initiate another cycle.

The injection molding conditions which were typically used are as follows:

| | |
|---|---|
| Barrel temperature | 285° F. (141° C.) |
| Mold temperature | 160° F. (71° C.) |
| Injection pressure | 13,000 psi ($8.96 \times 10^7$ Pa) |
| Holding pressure | 7000 psi ($4.83 \times 10^7$ Pa) |
| Back pressure | 50 psi ($3.44 \times 10^5$ Pa) |
| Injection forward time | 2 seconds |
| Holding pressure time | 8 seconds |
| Mold shut time | 300 seconds |
| Screw speed | 45 rpm |

The mold is designed such that two quarter ring segments are molded at the same time using a single gated cold runner system. White sidewall rings were assembled from the segments with overlapping tabs being bonded together with a gum stock or latex adhesive.

The white sidewall rings made were placed in the recessed groove of a standard tire mold. A standard blackwall P195/75R14 uncured tire was then placed onto the deflated bladder of the tire mold. The mold was closed and the bladder was inflated thereby bringing the green (uncured) tire into contact with the white sidewall ring. The tire was then cured using a mold temperature of 315° F. (157° C.), a bladder temperature of 340° F. (171° C.), and a bladder pressure of 300 psi ($2.07 \times 10^6$ Pascals). The tire was cured utilizing a cycle time of 13.2 minutes.

The tire was then removed from the tire mold. Over 175 tires were successfully built and cured utilizing this procedure. The molded tires exhibited desirable mold release with no blisters or delaminations, excellent mold surface detail with good location of the white sidewall and excellent adhesion.

The tires built were subjected to a series of tests to evaluate the performance and integrity of the white sidewall. The tires passed Department of Transportation (DOT) Endurance FMVSS-109 at full and half tire inflation pressure with no evidence of white sidewall defects. In addition, the DOT High Speed FMVSS-109 test was run with no signs of white sidewall failure.

The tires were also subjected to additional tests. Test tires exceed more than 40,000 miles on the Outdoor Resiliometer (ODR) without failure due to white sidewall delaminating and/or cracking. The experimental test tires were subjected to 300 hours of whole tire ozone chamber testing (50 parts per hundred million of $O_3$) and exhibited no signs of failure due to cracking.

The tires built utilizing the procedure of this invention were satisfactory in every way. Additionally, the tires built were superior to conventional white sidewall tires in several respects. For instance, the tires built utilizing the process of this invention were more uniform than standard whitewall tires. For example, they possess better balance from side to side. The removal of standard white sidewall compounds also eliminates problems associated with modulus transitions due to widely different compounding materials within the sidewall construction. The potential for the white splice in standard whitewall tires to open during curing and consequently causing a defect was also eliminated. Misalignment of the white sidewall material relative to the mold groove is a frequently encountered problem in conventional techniques for building whitewall tires which is also eliminated.

EXAMPLE 2

A blend containing 50 weight percent SPBD and 50 weight percent rubbers was prepared. The SPBD which was utilized had a melting point of 123° C. The rubber component utilized in the blend contained 60% chlorobutyl rubber, 35% natural rubber, and 5% EPDM rubbers. The blend prepared also contained about 1 phr of an antioxidant, about 37.5 phr of titanium dioxide (a white pigment), 27.5 phr of clay, about 0.5 phr of stearic acid, about 3.75 phr of zinc oxide, about 0.9 phr of sulfur, and about 1.16 phr of an accelerator. It should be noted that the SPBD utilized in accordance with this invention is a crosslinking thermoplastic resin and is considered to be a rubber in calculating phr (parts per hundred parts of rubber).

The SPBD/rubber composition blend was milled and calendared into a continuous sheet. A clicking die having a curvature which matched that of the recessed groove in the tire mold was used. Segmented strips were then spliced together to form a ring which was placed in the recessed groove of a standard tire mold. A standard blackwall P195/75R14 uncured tire was then placed onto the inflating bladder of the tire mold. The mold was closed and the bladder was inflated, thereby bringing the green tire into contact with the white sidewall ring. The tire was then cured at a mold temperature of 315° F. (157° C.), a bladder temperature of 340° F. (171° C.) and at a bladder pressure of 300 psi ($2.07 \times 10^6$ Pascals). The tire was cured utilizing a cycle time of 13.2 minutes.

The tire was then removed from the tire mold. Nine additional tires were successfully built and cured utilizing the same procedure. The white sidewalls on the tires made were precisely located with excellent mold detail and surface smoothness being obtained. The white SPBD/rubber blend flowed into the vent holes of the mold which is a good indication of melt flow. Excellent mold release was observed with no blisters or delaminations. Additionally, the splices between the ring segments were almost invisible. It should be noted, however, that such splices could be easily eliminated by preparing one piece ring structures. Adhesion was also adequate on demolding because there were no separations caused by pulling the tire out of the mold.

The tires built were subjected to the G05 Department of Transportation (DOT) endurance test for full and half tire inflation pressure and passed with no evidence of white sidewall cracking. A test tire also completed 300 hours of whole tire ozone chamber testing with no evidence of failure. The tires tested also passed outdoor resiliometer testing for failure due to sidewall delamination and/or cracking. Test tires were also subjected to a very severe curb scuff test. In this test the tire's white sidewalls were run against an abrasive curb surface for 200 feet (61 meters). After completion of the test, inspection of the tires revealed no adhesion loss between the white sidewall ring and the tire. However, some of the white SPBD/rubber composition was worn away to expose the black sidewall. This was, however, expected in such a severe test.

The tires built utilizing the procedure of this invention were satisfactory in every way. Additionally, the tires built were superior to conventional white sidewall tires in several respects. For instance, the tires built utilizing the process of this invention were more uniform than standard whitewall tires. For example, they possess better balance from side to side. The removal of standard white sidewall compounds also eliminates problems associated with modulus transitions due to widely different compounding materials within the sidewall construction. The potential for the white splice in standard whitewall tires to open during curing and consequently causing a defect was also eliminated. Misalignment of the white sidewall material relative to the mold groove is a frequently encountered problem in conventional techniques for building whitewall tires which is also eliminated.

Comparative Example 3

Tires were built utilizing the procedure described in Example 1 except that the white sidewall rings were made without including SPBD in the blend. It was readily determined that tires could not be made in this manner because the uncured white sidewall rings simply could not be handled.

Comparative Example 4

In this experiment, tires were built utilizing the procedure described in Example 1 except that the white sidewall rings were made with a blend which did not include SPBD. In an attempt to overcome the problem described in Comparative Example 1, the white sidewall rings were precured. Tires were successfully built. However, the tires made utilizing this procedure failed the curb scuff test. This was because there was inadequate adhesion between the precured white sidewall ring and the tire. This example shows that it is not viable to precure decorative tire sidewall appliques because unsatisfactory adhesion results. By including SPBD in the blend used in making the decorative applique, it is not necessary to precure the applique prior to affixing it to the tire sidewall.

EXAMPLES 5–13

SPBD imparts properties to green rubber that are desirable for improved handling characteristics for in mold applied white sidewall rings. The addition of SPBD having a melting point of 115° C., 123° C. or 141° C. at any level results in reduced tack, increased stiffness, and increased static modulus for green stocks. In this series of experiments, various levels of SPBD were blended with a rubber blend containing 60% chlorobutyl rubber, 35% natural rubber and 5% EPDM rubber. The physical properties of the uncured SPBD/rubber blends made are reported in Table I.

TABLE I

| Example | SPBD m.p., °C. | SPBD Level, % | Tensile* Strength | Elongation, % | 100%* Modulus | 300%* Modulus |
|---|---|---|---|---|---|---|
| 5 | — | 0 | 145 | >900 | 75 | 105 |
| 6 | 115 | 20 | 350 | 805 | 275 | 305 |
| 7 | 115 | 33 | 515 | 490 | 385 | 495 |
| 8 | 115 | 50 | 820 | 400 | 575 | 705 |
| 9 | 123 | 33 | 390 | 390 | 280 | 380 |
| 10 | 123 | 50 | 740 | 510 | 470 | 600 |
| 11 | 123 | 67 | 1220 | 580 | 740 | 890 |
| 12 | 141 | 33 | 410 | 330 | 310 | 400 |
| 13 | 141 | 50 | 830 | 310 | 670 | 820 |

*in pounds per inch$^2$

Example 5 was done as a control and did not include any SPBD. Tensile strength and elongation were determined by ASTM D-412. As can be seen, the incorporation of SPBD into the rubber blend yields high green strength and stiffness without the need for precure.

The SPBD/rubber blends made were then compounded with 1.0 phr of antioxidants, 1.0 phr of stearic acid, 27.5 phr of clay, 37.5 phr of titanium dioxide, 0.175 phr of a blue pigment, 5.0 phr of zinc oxide, 1.2 phr of sulfur, and 1.54 phr of an accelerator. The productive compounds made were then cured and the physical properties of the cured samples are reported in Table II.

TABLE II

| Example | Shore A | Tensile[a] Strength | Elongation, % | 50%[a] Modulus | Trouser[b] Tear | Strebler[c] Adhesion | DIN[d] Abrasion |
| --- | --- | --- | --- | --- | --- | --- | --- |
| 5  | 56 | 1190 | 560 | 180 | 60  | 50  | 370 |
| 6  | 70 | 1440 | 600 | 340 | 65  | 60  | 330 |
| 7  | 77 | 1460 | 540 | 480 | 70  | 70  | 330 |
| 8  | 85 | 1730 | 520 | 690 | 105 | 65  | 280 |
| 9  | 77 | 1590 | 570 | 450 | 90  | 50  | 320 |
| 10 | 85 | 1920 | 530 | 690 | 120 | 90  | 260 |
| 11 | 90 | 2220 | 505 | 885 | 185 | 105 | 200 |
| 12 | 80 | 1580 | 210 | 580 | 95  | 50  | 285 |
| 13 | 89 | 1850 | 390 | 920 | 140 | 100 | 195 |

[a] in pounds/inch$^2$
[b] in pounds/inch
[c] in pounds/inch width
[d] in mm$^3$ (relative loss)

The SPBD modified compounds exhibited increased tear, hardness and static modulus as well as improved abrasion resistance and enhanced adhesion to a black sidewall compound. The cured SPBD modified compounds showed physical properties which are superior for white sidewall applications.

SPBD compounds can be processed on conventional Banbury mixers, mills, calendering equipment and injection molders. However, higher processing temperatures are required depending upon the SPBD melting point range. For this reason, extending the scorch time is beneficial. The cure system used in the SPBD/rubber blend should, therefore, be adjusted to match the cure performance of a conventional white sidewall, otherwise delaminations and/or blisters may occur upon demolding the tire from the mold at the end of the curing cycle. Monsanto cure properties of the productive compounds made are reported in Table III.

TABLE III

| Example | T$_2$[a] | T$_{25}$[a] | T$_{90}$[a] | Torque[b] Maximum | Torque[b] Minimum | Delta[b] Torque |
| --- | --- | --- | --- | --- | --- | --- |
| 5  | 5.1 | 8.0  | 19.7 | 25.1 | 5.9  | 19.2 |
| 6  | 6.8 | 10.7 | 19.8 | 26.0 | 4.8  | 21.2 |
| 7  | 6.5 | 10.6 | 18.1 | 25.0 | 4.9  | 20.1 |
| 8  | 7.4 | 10.7 | 19.8 | 24.2 | 3.8  | 20.4 |
| 9  | 7.6 | 10.1 | 22.9 | 26.5 | 7.7  | 18.8 |
| 10 | 7.5 | 8.9  | 19.8 | 26.0 | 7.7  | 18.3 |
| 11 | 7.0 | 9.0  | 19.2 | 26.6 | 7.8  | 19.0 |
| 12 | 7.5 | 10.0 | 23.3 | 29.8 | 11.6 | 18.2 |
| 13 | 7.6 | 10.7 | 24.5 | 34.0 | 15.7 | 18.3 |

[a] Reported in minutes
[b] decinewton · meters (dN · m)

The Monsanto Cure Rheometer was run at 302° F. (150° C.), 1 degree arc and 100 cycles per minute for a 60 minute test period. The cure packages used in the compounds listed in Table III were adjusted to reflect the addition of SPBD to the compound. The SPBD is treated as a crosslinkable polymer and not as a filler additive. The SPBD/rubber compound should have a cure time (T90) which is essentially equivalent to that of a standard white sidewall compound used in the black sidewall of a conventional tire.

EXAMPLE 14

In this procedure, tires having decorative appliques on the sidewalls thereof were prepared. Goodyear's Wingfoot ® design was applied to the tire sidewalls in this procedure.

An experimental steel rule clicking die for the Goodyear logo was constructed. The Wingfoot ® design was omitted for simplicity. Letters in the logo had a height of about 0.80 inches.

The SPBD/rubber compound utilized in making the logo was prepared by mixing 50 parts of SPBD (having a melting point of 141° C.), 30 parts of halobutyl rubber, 17.5 parts of natural rubber, 2.5 parts of EPDM rubber, 1 part of an antioxidant, 4.75 parts of processing aids (oils and waxes), 27.5 parts of clay, 37.5 parts of titanium dioxide, 0.175 parts of blue pigment, 3.75 parts of zinc oxide, 0.90 parts of sulfur, 1.15 of a primary accelerator and 0.30 parts of a secondary accelerator. These SPBD/rubber blends were prepared by utilizing standard Banbury mixing techniques for non-productive and productive compounds. The blends were milled into continuous sheets. However, such sheets could also be prepared by calendering. The temperature used in the milling procedure was somewhat higher than temperature normally required because of the melting point and amount of SPBD utilized in the blend. The logo was clicked out from the sheets using the appropriate clicking die. The logos prepared had a typical thickness of about 30 mils. After the letters were clicked out, the scrap stock was removed and the letters were transferred to a conventional rubber stock (having a thickness of 30 mils) by contact. The rubber stock utilized should be soft and tacky to provide adequate properties as the backing stock which can also serve as a stain-barrier compound. The decorative applique was applied to the tire sidewall components before the tire was built. In other instances, the decorative applique was applied to green tires before shaping, or to green tires after shaping or by placing the applique into the tire mold before placing the tire therein.

The green tires were cured utilizing standard techniques. The decorative designs on the tires built maintained distinctness after curing with only minimal distortion. When logos were placed on a non-shaped tire, the letters radiused nicely upon shaping and remained tacked to backing stocks. When the tires were placed in the tire mold or applied to the shaped green tire, the resulting logo was molded directly into the rubber with very little distortion. Based upon tire molding, the best results for letter definition were obtained for compounds containing 50% SPBD having a melting point of 141° C. Logos which were prepared utilizing SPBD having a melting point of 123° C showed more of a tendency toward flowing and distorting but were also deemed to be acceptable.

The radial medium truck tires which were built were tested for ozone resistance and bead area durability. After 300 hours of testing in an ozone chamber, the logos exhibited some cracking but it was no worse than was experienced on the sidewalls of the tires. No edge separation occurred with the logos. Logos which were prepared utilizing SPBD having a melting point of 141° C. experienced slightly more cracking than those prepared utilizing the SPBD having a melting point of 123° C. but was not considered to be objectionable. Truck tires which were built utilizing this procedure have completed 11,000 miles of bead out durability testing. The logos were positioned in the lower sidewall, the middle sidewall and the upper sidewall of test tires. No cracking of the logos was observed regardless of the position in the sidewall for the compounds which were made utilizing SPBD having a melting point of 123° C. or 141° C. Based upon these test results, the more preferred location for truck tire logo placement is on the upper sidewall near the gravel guard groove. It was also determined that the logos should be streamlined and radiused in critical areas such as corners to eliminate points of stress concentration.

EXAMPLE 15

In this experiment P195/75R14 tires were made using the technique described in Example 1, except the SPBD utilized had a melting point of only 92° C. The procedure used in this example also differed from the procedure of Example 1 in that a whole white sidewall ring having a thickness of 85 mils was made by injection molding. The tires made were equivalent to the tires made in Example 1. This example shows that SPBD having a melting point of only 92° C. can be used in the practice of this invention. It also shows that one-piece white sidewall rings can be made by injection molding.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire having a decorative applique on the sidewall thereof, comprising an outer circumferential tread, a supporting carcass therefor, two-spaced beads and two rubber sidewalls connecting said beads; wherein at least one of said sidewalls has a decorative applique thereon; wherein the decorative applique has a thickness which is within the range of about 10 mils to about 125 mils; and wherein said decorative applique is comprised of from about 25 weight percent to about 75 weight percent syndiotactic 1,2-polybutadiene having a melting point of less than about 160° C. and from about 25 weight percent to about 75 weight percent of at least one polydiene rubber which is cocured with said syndiotactic 1,2-polybutadiene, and at least one pigment or colorant.

2. A method of preparing a pneumatic rubber tire having a decorative applique on the sidewall thereof which comprises (a) applying the decorative applique to the sidewall of an uncured tire wherein the decorative applique has a thickness which is within the range of about 10 mils to about 125 mils; and (b) curing the tire; wherein the decorative applique is comprised of from about 25 weight percent to about 75 weight percent syndiotactic 1,2-polybutadiene having a melting point of less than about 160° C. and from about 25 weight percent to about 75 weight percent of at least one polydiene rubber which is cocurable with said syndiotactic 1,2-polybutadiene, sulfur, zinc oxide and at least one pigment or colorant.

3. A pneumatic tire having a decorative applique on at least one sidewall thereof, the improvement which comprises utilizing as the material for the decorative applique a blend of syndiotactic 1,2-polybutadiene having a melting point of less than about 160° C. and at least one rubber which is cocurable with the syndiotactic 1,2-polybutadiene: wherein the applique has a thickness which is within the range of about 10 mils to about 125 mils: wherein the blend contains from about 25 weight percent to about 75 weight percent syndiotactic 1,2-polybutadiene and from about 25 weight percent to about 75 weight percent of the rubber based upon the total amount of polymers in the blend; and wherein the blend further comprises at least one pigment or colorant.

4. A pneumatic tire as specified in claim 3 wherein the rubber is cis-1,4-polybutadiene.

5. A pneumatic tire as specified in claim 3 wherein the rubber is styrene-butadiene rubber.

6. A pneumatic tire as specified in claim 3 wherein the rubber is natural rubber or synthetic polyisoprene.

7. A pneumatic tire as specified in claim 3 wherein the rubber is a blend of a halobutyl rubber, natural rubber, and an EPDM rubber.

8. A pneumatic tire as specified in claim 7 wherein the halobutyl rubber is a chlorobutyl rubber.

9. A pneumatic tire as specified in claim 8 wherein the rubber is comprised of from about 30 to about 80 weight percent chlorobutyl rubber, from about 15 to about 55 weight percent natural rubber, and from about 2 to about 10 weight percent EPDM rubber.

10. A pneumatic tire as specified in claim 9 wherein the blend is comprised of from about 33 weight percent to about 67 weight percent syndiotactic 1,2-polybutadiene.

11. A pneumatic tire as specified in claim 10 wherein the rubber is comprised of from about 25 weight percent to about 45 weight percent natural rubber and from about 3 weight to about 7 weight percent EPDM rubber.

12. A pneumatic tire as specified in claim 11 wherein said blend is comprised of from about 45 weight percent to about 55 weight percent syndiotactic 1,2-polybutadiene.

13. A pneumatic tire as specified in claim 12 wherein the melting point of the syndiotactic 1,2-polybutadiene is within the range of about 70° C. to about 160° C.

14. A pneumatic tire as specified in claim 12 wherein the melting point of the syndiotactic 1,2-polybutadiene is within the range of about 80° C. to about 150° C.

15. A pneumatic tire as specified in claim 12 wherein the pigment or colorant is titanium dioxide.

16. A pneumatic tire as specified in claim 12 wherein the colorant is selected from the group consisting of diarylid yellow 17, pththalocy blue 15, diarylid orange 13, and perm red 28.

17. A method as specified in claim 2 wherein the decorative applique is positioned in a mold prior to putting the uncured tire therein.

18. A method as specified in claim 17 wherein the decorative applique is cocured with the sidewall of the tire.

19. A pneumatic tire as specified in claim 12 wherein the melting point of the syndiotactic 1,2-polybutadiene is within the range of about 90° C. to about 125° C.

20. A method as specified in claim 2 wherein the melting point of the syndiotactic 1,2-polybutadiene is within the range of about 80° C. to about 150° C.

* * * * *